(12) United States Patent
Gupta et al.

(10) Patent No.: US 10,997,372 B2
(45) Date of Patent: May 4, 2021

(54) COMPUTER SYSTEMS AND METHODS FOR REPRESENTATIVES TO MONITOR AND INTERVENE IN ROBOT CONVERSATION

(71) Applicant: FMR LLC, Boston, MA (US)

(72) Inventors: Manish Gupta, Bhopal (IN); Rajib Biswas, Bongaon (IN); Srijan Saket, Ranchi (IN)

(73) Assignee: FMR LLC, Boston, MA (US)

( * ) Notice: Subject to any disclaimer, the term of this patent is extended or adjusted under 35 U.S.C. 154(b) by 142 days.

(21) Appl. No.: 16/363,896

(22) Filed: Mar. 25, 2019

(65) Prior Publication Data
US 2020/0311204 A1 Oct. 1, 2020

(51) Int. Cl.
*G06F 17/00* (2019.01)
*G06F 40/30* (2020.01)
*G06N 5/04* (2006.01)
*G06N 20/00* (2019.01)

(52) U.S. Cl.
CPC .............. *G06F 40/30* (2020.01); *G06N 5/04* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 8,054,964 B2 | 11/2011 | Flockhart et al. | |
| 8,239,246 B1* | 8/2012 | Bigham | G06Q 40/08 705/7.38 |
| 8,949,377 B2 | 2/2015 | Makar et al. | |
| 9,794,199 B2 | 10/2017 | Capper et al. | |
| 2014/0244264 A1 | 8/2014 | Thirumalainambi et al. | |
| 2014/0316767 A1 | 10/2014 | Fitterer et al. | |
| 2017/0017694 A1 | 1/2017 | Roytman et al. | |
| 2018/0211259 A1* | 7/2018 | Vu | G06Q 10/087 |
| 2019/0102709 A1* | 4/2019 | Correa | G06N 20/00 |
| 2019/0362253 A1* | 11/2019 | Francis | H04L 51/04 |
| 2020/0159778 A1* | 5/2020 | Mohanty | G06N 3/049 |

* cited by examiner

*Primary Examiner* — Satwant K Singh
(74) *Attorney, Agent, or Firm* — Proskauer Rose LLP

(57) ABSTRACT

A computerized method of assessing a chatbot conversation includes: extracting one or more messages from the conversation; determining, based on the one or more messages, an existing business opportunity value score using a business opportunity state detector module; determining, based on the one or more messages, an existing user experience score using a user experience state detector module of the computing device; determining, based on the one or more messages, a future business opportunity value score using a future business opportunity predictor module of the computing device; determining, based on the one or more messages, a future user experience score using the future user experience predictor module of the computing device; calculating a composite score indicating whether human intervention in the chatbot conversation is desirable; and generating a display signal including a status indicator, for review by a human agent, reflecting a desirability of human intervention in the chatbot conversation.

17 Claims, 8 Drawing Sheets

US 10,997,372 B2

COMPUTER SYSTEMS AND METHODS FOR REPRESENTATIVES TO MONITOR AND INTERVENE IN ROBOT CONVERSATION

TECHNICAL FIELD

This application relates generally to systems, methods and apparatuses, including computer programs, for improved virtual assistant (VA) technology. More specifically, this application relates to assessing a chatbot conversation with a user to detect user experience and business signals from the user and allow a human representative to intervene as desired.

BACKGROUND

Large organizations are increasingly using VA technology to manage many aspects of customer relationships, e.g., providing technical support via chatbots. However, when deployed in this context, VA technology can suffer from a number of drawbacks. For example, a VA may not be able to understand a user's question, particularly in the context of the longer discussion in which it occurs, and may not be able to respond appropriately, leading to a loss in customer experience. In addition, VA technology may not be capable of maximizing certain business opportunities presented while interacting with the customer, such as taking natural opportunities to up-sell or cross-sell products. In addition, traditional VA channels may not provide information related to leads and prospects for businesses to act upon after the chat conversation, leading to further loss of business opportunities.

Existing patents in this field focus primarily on extracting social emotions from chats. For example, U.S. Patent Publication No. 2014/0244264 describes a method of analyzing and presenting results of human emotion during a session such as chat, video, audio and combinations thereof in real time. However, this analysis is focused on semiotic analysis and ignores interaction signals provided over text-based chat—as do most other patents in this field. Further, existing patents do not exploit the future course of chat and associated business and experience possibilities to gauge need of human intervention.

SUMMARY

Accordingly, the invention provides a framework, including a computing system and associated computing methods and modules, for VA technology to operate and be monitored in an environment in which human customer representatives can intervene as desired. Such intervention may provide methods or opportunities to achieve one or more of the following: (i) detection of user experience and/or business signals from ongoing chatbot-driven interactions with customers; (ii) evaluation of these user experience and business signals in real time throughout a customer chat dialogue, e.g., to decide if human intervention would be desirable; and (iii) allowing a company representative to intervene and take over the chatbot driven conversation.

In this manner, the invention allows chatbots to handle many mundane customer service-related queries and direct to human representatives conversations requiring more sophisticated follow up, e.g., certain business conversations with sale opportunities. The invention also provides a real-time staffing tool for bringing operational efficiency to customer interactions, e.g., by tuning how much and how sophisticated conversations handled by chatbots are allowed to be. Thus, the invention can scale customer service operations using a blend of virtual assistants and customer representatives without suffering the loss of business opportunity or customer experience traditionally associated with VA technology. In addition, the invention can also help measure customer satisfaction to permit improvement of systems and processes.

The invention also enables extraction of usable business information, including calculating a propensity of customers to perform a certain task (e.g., close an account) in real time, thus providing actionable business intelligence for possible human intervention. In addition, the invention permits not just computation of a current state of experience or business opportunity, but also prediction of possible future states as a conversation progresses. A combination of current states and possible future states can be used to determine if there is a need for human intervention. Prediction of future states can be achieved by training a machine learning model on historical chat sessions and applying it real time to current ongoing chat to predict possible follow-up questions and customer reactions to responses. The invention also allows building of correct and context-sensitive responses to new questions in real time through human assistance, as well as using human responses as feedback to train the chatbot response generator in real time.

In one aspect, the invention features a computerized method of assessing a chatbot conversation with a user. The method includes extracting, by a computing device, one or more textual messages from the chatbot conversation. The method also includes determining, by the computing device, based on the one or more textual messages, an existing business opportunity value score after a textual message occurs in the chatbot conversation using a business opportunity state detector module of the computing device. The method also includes determining, by the computing device, based on the one or more textual messages, an existing user experience score after the textual message occurs in the chatbot conversation using a user experience state detector module of the computing device. The method also includes determining, by the computing device, based on the one or more textual messages, a future business opportunity value score after the textual message occurs in the chatbot conversation using a future business state predictor module of the computing device. The method also includes determining, by the computing device, based on the one or more textual messages, a future user experience score after the textual message occurs in the chatbot conversation using a future experience state predictor module of the computing device. The method also includes calculating, by the computing device, for the chatbot conversation, a composite score indicating whether human intervention in the chatbot conversation is desirable, the composite score based on the existing business opportunity value score, the existing user experience score, the future business opportunity value score, and the future user experience score. The method also includes generating, by the computing device, a display signal including a status indicator, for review by a human agent, reflecting a desirability of human intervention in the chatbot conversation, a value of the status indicator based on the composite score.

In some embodiments, the method further includes displaying, by a screen in electronic communication with the computing device, the status indicator based on the display signal. In some embodiments, the method further includes providing, by the computing device, a hyperlink permitting the human agent to monitor the chatbot conversation in real-time. In some embodiments, the method further includes determining, by the computing device, a new value for each of the existing user experience score, the existing business opportunity value score, the future business opportunity value score, the future user experience score, and the composite score each time a new message occurs; and updating, by the computing device, the value of the status indicator accordingly. In some embodiments, the value of the status indicator is one of multiple possible values, each possible value corresponding to a range of possible composite scores falling within an upper boundary and a lower boundary. In some embodiments, the upper and lower boundaries are adjustable by the human agent or another operator to accommodate varying levels of incoming customer conversation traffic.

In some embodiments, the method further includes providing, by the computing device, a feedback signal including a prediction of at least one of (i) an experience metric for the user; (ii) a business opportunity metric associated with the user, based on expected business activity by the user during a specified interval following termination of the chatbot conversation; or (iii) one or more follow up questions by the user at one or more stages of the chatbot conversation, based on a textual representation of the chatbot conversation at a corresponding point in time. In some embodiments, the method further includes performing, by the computing device, each step of the method for multiple simultaneous chatbot conversations.

In another aspect, the invention features a computerized method of training a business opportunity state detector module. The method includes extracting, by a computing device, one or more textual messages sent by a user during one or more chatbot conversations. The method also includes determining, by the computing device, for each of the one or more textual messages, a user intent using an intent classifier module of the computing device. The method also includes receiving, by the computing device, for each chatbot conversation, user business activity information reflecting business activity of the user for a period of time after termination of the chatbot conversation. The method also includes calculating, by the computing device, for each chatbot conversation, a business value corresponding to the chatbot conversation for the period of time after termination of the chatbot conversation, the business value based on the one or more user intents and the user business activity information. The method also includes calculating, by the computing device, a normalized business value for each user intent. The method also includes generating, by the computing device, a mapping file correlating each user intent with each corresponding normalized business value.

In some embodiments, the method further includes calculating, by the computing device, using the mapping file, a new business value each time a new message occurs in an ongoing chatbot conversation. In some embodiments, the textual messages are included within user chat logs or phone call transcripts. In some embodiments, the business activity includes information about at least one of the user's opening an account, purchasing a product, requesting an additional service, closing an account, adding assets, removing assets, or making an informational inquiry. In some embodiments, determining the one or more user intents includes extracting business intents and filtering out other intents including social intents. In some embodiments, extracting the one or more textual messages includes creating a table of extracted user messages, each user message including a corresponding session identifier and intent identifier.

In another aspect, the invention features a computerized method of training a user experience state detector module. The method includes extracting, by a computing device, one or more textual messages sent by a user during one or more chatbot conversations. The method also includes analyzing, by the computing device, each chatbot conversation for a presence of one or more words evidencing emotion by the user via cross-referencing the chatbot conversation with a word list stored in a database in electronic communication with the computing device. The method also includes training, by the computing device, an emotional state classifier module for predicting an emotional state of the user based on the one or more textual messages. The method also includes analyzing, by the computing device, each chatbot conversation for a presence of interactions signals evidencing a user experience of the user. The method also includes training, by the computing device, an experience state classifier module for predicting an experience state of the user based on the one or more words evidencing emotion by the user and the interactions signals.

In some embodiments, the method further includes calculating, by the computing device, an experience state each time a new message occurs in an ongoing chatbot conversation. In some embodiments, the method further includes predicting, by the computing device, using an emotional state classifier module, an emotional state of the user based on the chatbot conversation. In some embodiments, the emotional state is categorized into one of joy, fear, surprise, sadness, anger, gratitude, disgust, and neutrality. In some embodiments, the user experience state classifier module predicts the user experience state as either positive, negative, or neutral.

In another aspect, the invention features a computerized method of training a future business state predictor module. The method includes extracting, by a computing device, one or more textual messages sent by a user during one or more chatbot conversations. The method also includes determining, by the computing device, for each of the one or more textual messages, a user intent using an intent classifier module of the computing device. The method also includes training, by the computing device, a conversation predictor model using a sequence of one or more user intents across different chatbot conversations.

In some embodiments, the method further includes calculating, by the computing device, a future business state each time a new message occurs in an ongoing chatbot conversation. In some embodiments, the method further includes (i) predicting, by the computing device, using the conversation predictor model, a probability of each unique intent occurring for each of a fixed number of future messages (k); (ii) based on the probability for each unique intent occurring and an intent-business opportunity value map, calculating, by the computing device, an expected business value for each future message; and (iii) based on the expected business value for each future message, calculating, by the computing device, a weighted sum of expected business values from 1 to k, thereby determining an expected value of future business opportunity for the session.

In another aspect, the invention features a computerized method of training a future experience state predictor module. The method includes extracting, by a computing device, one or more textual messages sent by a user during one or more chatbot conversations. The method also includes determining, by the computing device, for each of the one or more textual messages, a user intent using an intent classifier module of the computing device. The method also includes training, by the computing device, a conversation predictor model using the sequences of one or more user intents across different chatbot conversations. The method also includes calculating, by the computing device, the future experience state each time a new message occurs in an ongoing chatbot conversation.

In some embodiments, the method further includes (i) predicting, by the computing device, using the conversation predictor model, a probability of each unique intent occurring for each of a fixed number of future messages (k); (ii) based on the probability for each unique intent occurring and an intent-user experience value map, calculating, by the computing device, an expected user experience value for each future message; and (iii) based on the expected user experience value for each future message, calculating, by the computing device, a weighted sum of expected user experience values from 1 to k, thereby determining an expected value of user experience for the session.

In another aspect, the invention features a computerized system for assessing a chatbot conversation with a user. The system includes a computing device capable of extracting one or more textual messages from the chatbot conversation. The computing device includes a user chat interface module for receiving user query messages and generating chatbot reply messages. The computing device also includes a business opportunity state detector module for determining, based on the one or more textual messages, an existing business opportunity value score after a textual message occurs in the chatbot conversation. The computing device also includes a user experience state detector module for determining, based on the one or more textual messages, an existing user experience score after a textual message occurs in the chatbot conversation. The computing device also includes a future business opportunity state predictor module for determining, based on the one or more textual messages, a future business opportunity value score after a textual message occurs in the chatbot conversation. The computing device also includes a future user experience state predictor module for determining, based on the one or more textual messages, a future user experience score after a textual message occurs in the chatbot conversation.

The computing device is further capable of calculating a composite score indicating whether human intervention in the chatbot conversation is desirable, the composite score based on the existing business opportunity value score, the existing user experience score, the future business opportunity value score, and the future user experience score. The computing device is further capable of generating a display signal including a status indicator, for review by a human agent, reflecting a desirability of human intervention in the chatbot conversation, a value of the status indicator based on the composite score. The computing device further includes a database in electronic communication with the computing device, the database including textual files of one or more chatbot conversations.

In some embodiments, the system includes a screen, in electronic communication with the computing device, capable of displaying the status indicator based on the display signal. In some embodiments, the computing device further includes a human intervention need score generating module for calculating the composite score. In some embodiments, the computing device further includes a feedback signal generator for generating and sending a feedback signal indicating an user experience to a virtual agent. In some embodiments, the computing device further includes a lead signal generator for providing a signal to a dashboard for monitoring by a virtual agent. In some embodiments, the computing device periodically updates at least one of the conversation predictor module, existing business opportunity classifier module, future business opportunity classifier module, current experience classifier module, or future experience classifier module based on further accumulated data. In some embodiments, the computing device periodically re-trains at least one of the conversation predictor module, existing business opportunity classifier module, future business opportunity classifier module, current experience classifier module, or future experience classifier module based on feedback from the feedback signal generator. In some embodiments, the computing device updates the business opportunity state predictor module periodically based on further accumulated textual messages from the chatbot conversation. In some embodiments, the computing device further generates predictions of future user intents to occur in the chatbot conversation and compares the predictions to real subsequent chatbot conversation messages to update a conversation predictor module of the computerized system accordingly.

The invention can also help an organization to maintain a fine balance between the scale and the efficiency that VA brings and the skill sets that human agents bring with respect to handing customers and/or making the most of business opportunities. This invention can also help assess the performance of the VA deployed within the organization. Further, the invention can also help build new agent curated question-answer pairs, which may be used for programming the VA.

BRIEF DESCRIPTION OF THE DRAWINGS

The advantages of the invention described above, together with further advantages, may be better understood by referring to the following description taken in conjunction with the accompanying drawings. The drawings are not necessarily to scale; emphasis is instead generally placed upon illustrating the principles of the invention.

DETAILED DESCRIPTION

Figure 1:
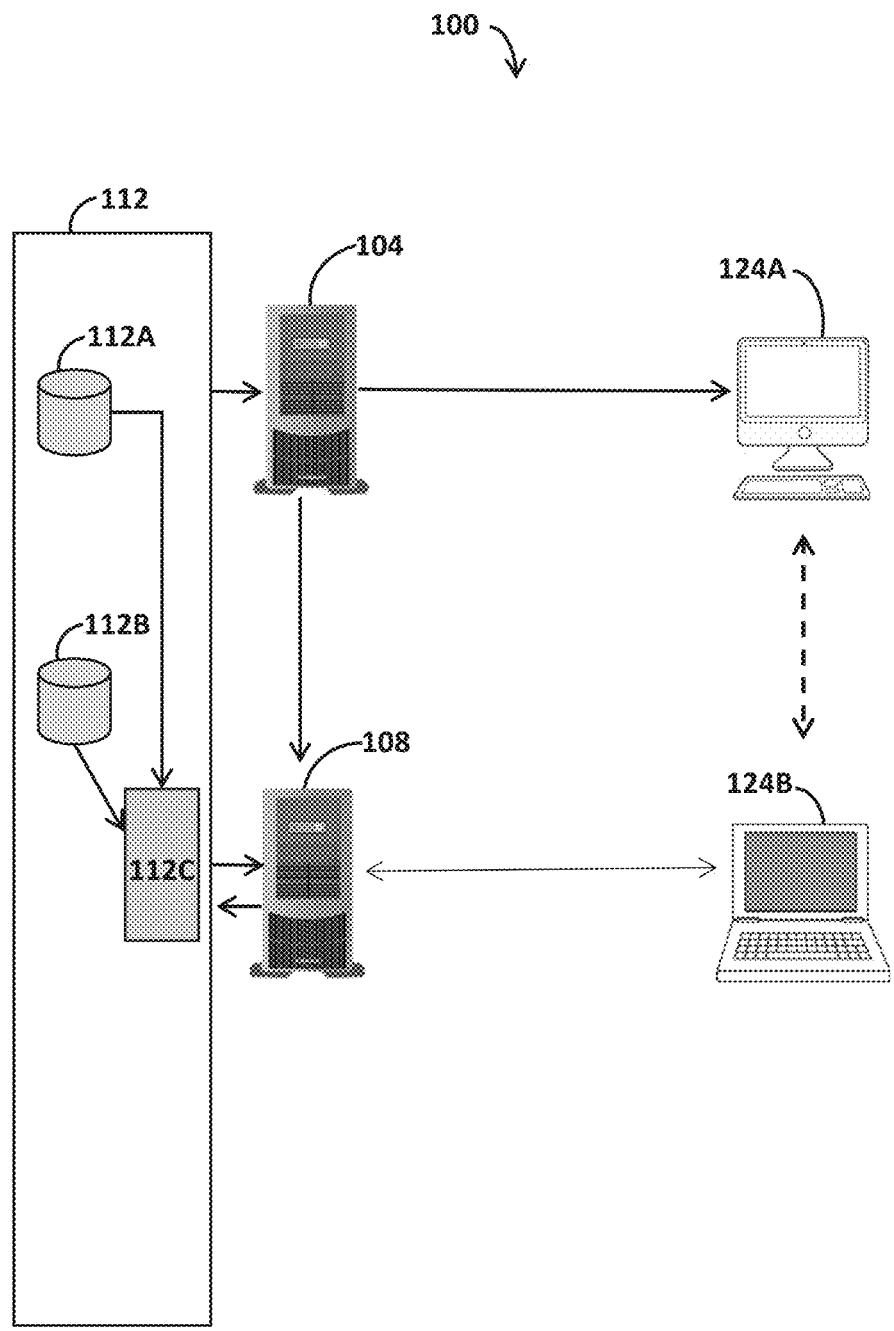
FIG. 1 is a schematic diagram of a computing system for providing an improved virtual assistant, according to an illustrative embodiment of the invention.

FIG. 1 is a schematic diagram of a computing system 100 for providing a virtual assistant, according to an illustrative embodiment of the invention. The computing system 100 includes a first server 104 (e.g., a conversation signal detection server) and a second server 108 (e.g., a chatbot server). The first server 104 and the second server 108 are in electronic communication with a set of databases 112, e.g., a first database 112A (such as a chat logs database) and a second database 112B (such as a chat signal logs database). Each of the databases 112A, 112B can be stored over a Hadoop cluster node and can be in communication with a data query interface layer, for example the hive 112C as shown, for interacting with the servers 104, 108. The first server 104 can be in electronic communication with a first front-end device 124A (e.g., an agent computer having a chat monitoring screen). The second server 108 can be in electronic communication with a second front-end device 124B (e.g., one or more customer computers). The first front-end device 124A can display a chat monitoring screen that enables one or more chatbot conversations to be re-directed to a live chat with the agent (e.g., a direct chat between the first front-end device 124A and the second front-end device 124B). The first server 104 is in electronic communication with second server 108 to send feedback signals. The computing system 100 can be used to implement one or more of the methods and/or computing architectures and modules described in greater detail below.

Figure 2:
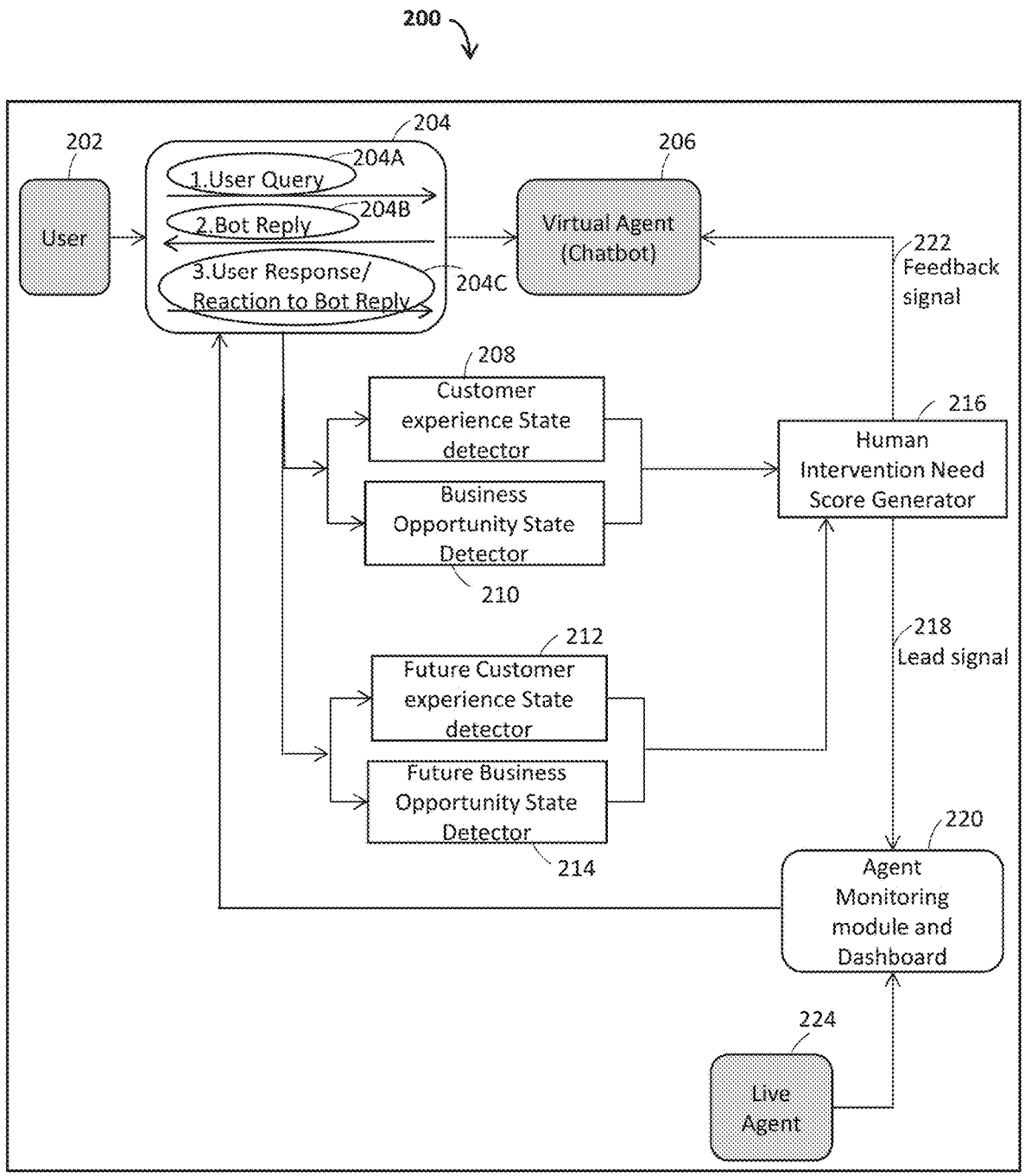
FIG. 2 is a schematic diagram of a computing architecture for providing an improved virtual assistant, according to an illustrative embodiment of the invention.

FIG. 2 is a schematic diagram of a computing architecture 200 for providing an improved virtual assistant, according to an illustrative embodiment of the invention. A user 202 interacts with a VA 206, such as a chatbot, for example, via a chatroom 204 that facilitates a conversation (e.g., including one or more user queries 204A, one or more VA replies 204B, and one or more user reactions to the VA replies 204C). As the conversation unfolds, a customer (or user) experience state detector module 208 and a business opportunity state detector module 210 receive the messages from the conversation and analyze them in real-time. For example, the customer experience state detector 208 analyzes user reactions based on textual replies provided during the conversation, e.g., as set forth in greater detail below in FIG. 3. A final experience score is assigned based on the emotion signals and other interaction signals (e.g., including clicking on a VA provided link or receiving explicit user feedback acknowledgement). In addition, the business opportunity state detector 210 module actively monitors the user messages for potential business opportunities, such as selling new product or getting leads for marketing or promotion, e.g., as set forth in greater detail below in FIG. 4.

Future customer experience state detector module 212 and future business opportunity state detector module 214 also receive the messages from conversation and their output is provided to a human intervention need score generator 214 along with the output from customer experience state detector module 208 and the business opportunity state detector module 210. The future customer experience state detector module 212 and future business opportunity state detector module 214 predict one or more subsequent (e.g., the next) user experience and business opportunity state respectively using a machine learning model trained on historical chat interaction sessions. The human intervention need score generator 216 calculates, based on a predefined threshold, whether each user reaction message will be flagged as sensitive or not. The future customer experience state detector module 212 and future business opportunity state detector module 214 also provide output to the human intervention need score generator 216 to aid in the assessment of whether human intervention is needed or desired.

The human intervention need score generator 216 provides a lead signal 218 to an agent monitoring module (e.g., dashboard) 220 to alert a live agent of the need or desirability of human intervention. The human intervention need score generator 216 also provides a feedback signal 222 to the VA 206, e.g., containing information about the user experience of the customer and whether the bot was able to handle the conversation successfully or not. The feedback signal 222 is also used to re-train the machine learning models of the VA 206. The agent monitoring module 220 can be used to provide a live agent 224 (e.g., a human supervisor) with the option to join the chatroom based on the lead signal 218. A feedback log can help to improve the VA system, e.g., a detail diagnosis about the success or failure rate of the VA can help to identify areas for improving the VA.

Figure 3:
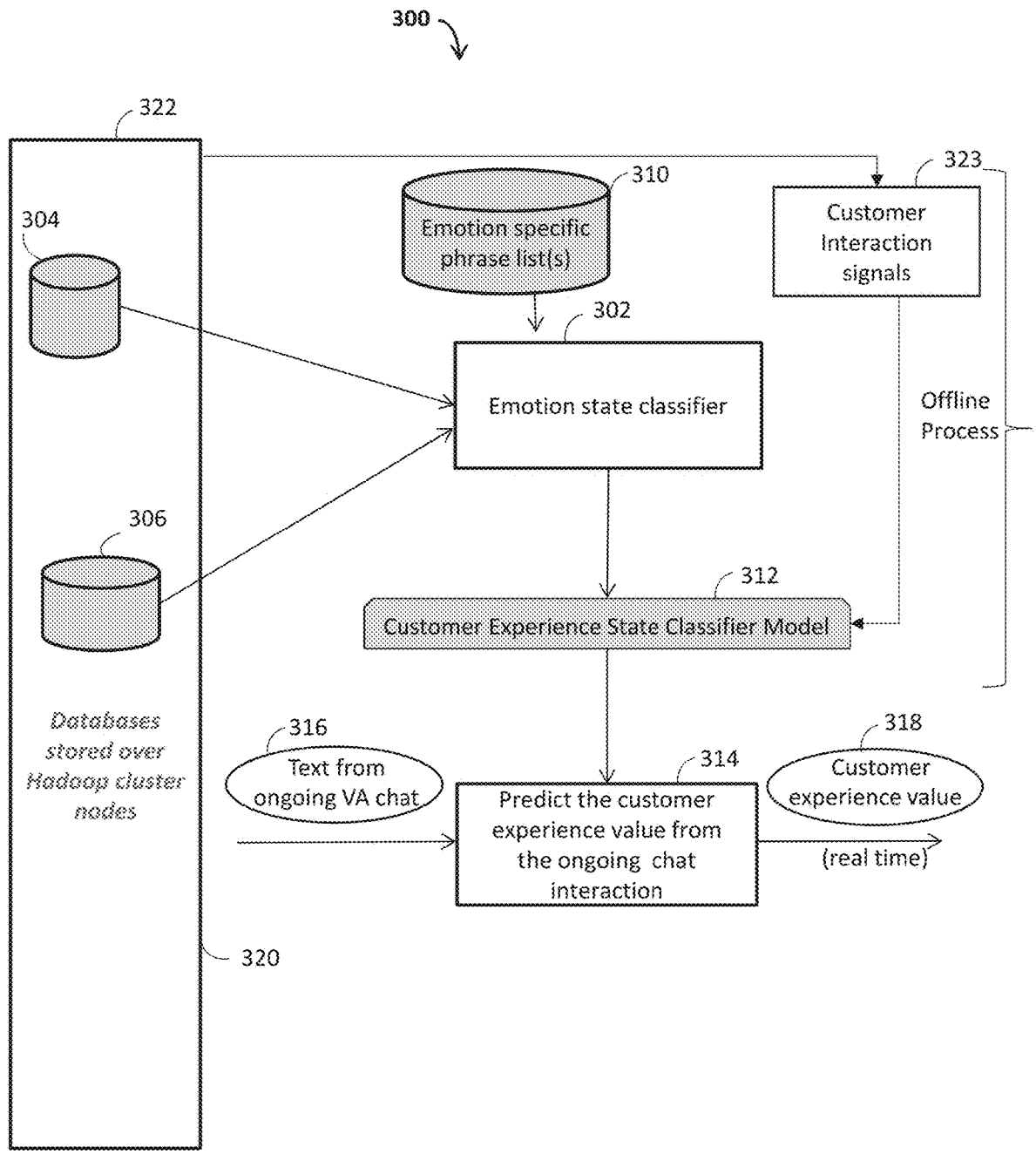
FIG. 3 is a schematic diagram of a method of training and utilizing a user experience state classifier module, according to an illustrative embodiment of the invention.

FIG. 3 is a schematic diagram of a method 300 of training and utilizing a user experience state classifier module 312, according to an illustrative embodiment of the invention. The training step 302 is based on a set of historical data, including chat data 304, phone call transcript data 306, and one or more emotion-specific phrase lists 310. One or more of these historical data sets can be stored on a single Hadoop cluster node, e.g., the node 320 as shown. The experience state classifier module 312 accepts inputs as emotional state value and user interaction signals extracted from chat in step 323 and predicts user experience score as output basis of the logistic regression based classifier. In one embodiment, a list of emotions to be detected by the emotional state classifier module 312 includes joy, fear, surprise, sadness, anger, gratefulness, disgust, and neutrality. Then, to utilize the experience state classifier module 312 during a chat interaction, text and interaction signals from an ongoing VA chat 316 may be processed through the experience state classifier module 312 in a prediction step 314 to predict a user experience state 318 of the user in real-time or near real-time. In one embodiment, the predicted user experience state can fall into one of three classes: Positive, Negative or Neutral.

Figure 4:
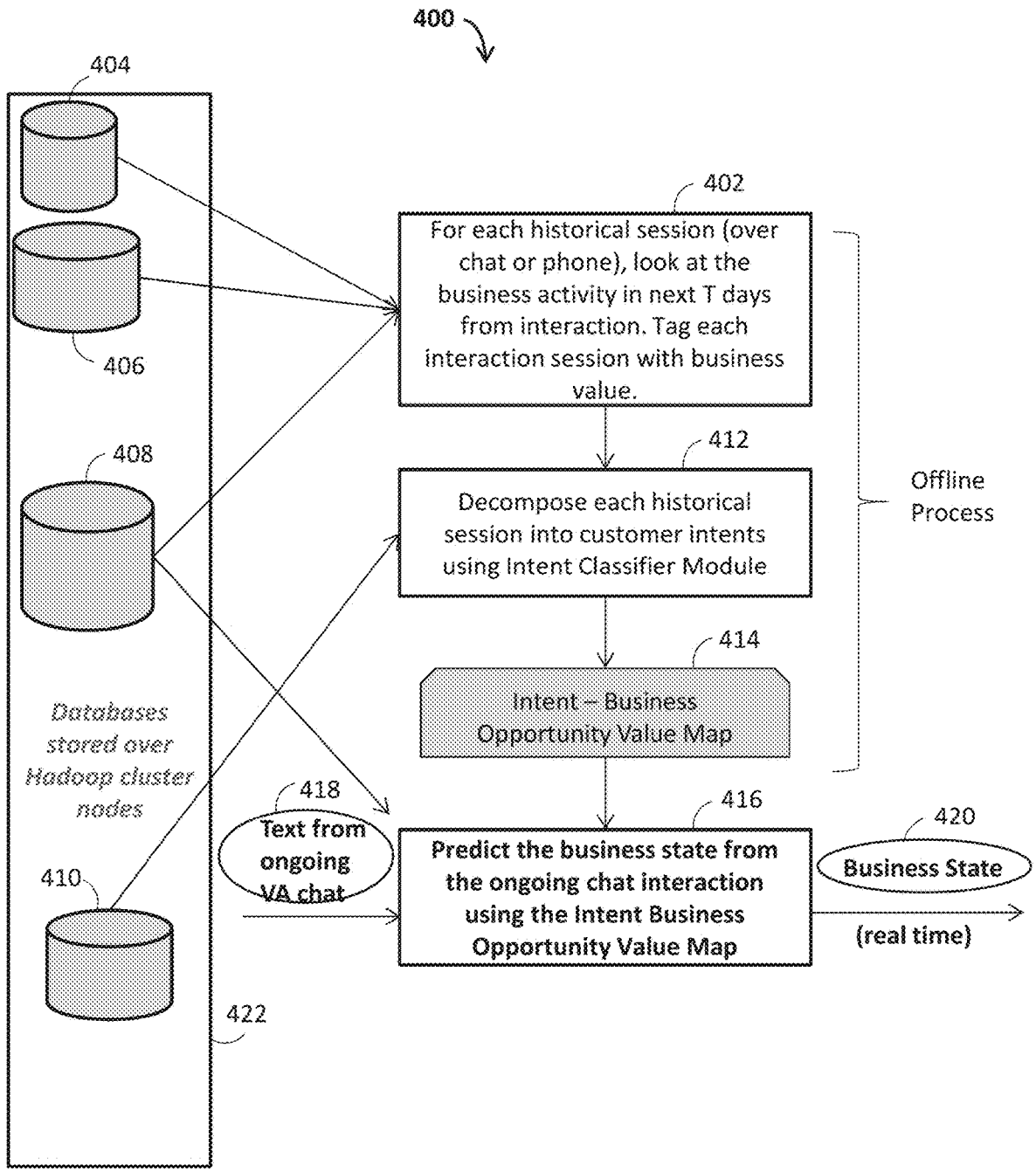
FIG. 4 is a schematic diagram of a method of creating and utilizing a Intent-Business Opportunity Value Map, according to an illustrative embodiment of the invention.

FIG. 4 is a schematic diagram of a method 400 of creating and utilizing a Intent-Business Opportunity Value Map 414, according to an illustrative embodiment of the invention. The tagging step 402 is based on a set of historical data, including chat data 404, phone call transcript data 406, customer account information data 408 and Intent & Intent Variation Table 410. One or more of these historical data sets can be stored on a single Hadoop cluster node, e.g., the node 422 as shown. The step 412 includes decomposing the session into intents using an intent classifier program. The Table Intent-Business Opportunity Value Map 414 is formed using steps 402 and 412. Text from an ongoing VA chat 418 may be assigned business opportunity value 420 by looking over the business opportunity values of in ongoing chat through Intent-Business Opportunity value Map 414 in the prediction step 416 in real-time or near real-time.

In some embodiments, the business state classifier module 414 is created according to the following steps. First, a list of all unique user intents and their variations is extracted from Intent and Intent Variation Table 410. Let $N_{Intents}$ equal the total number of business-related intents (social greetings and related intents may be filtered out). Second, historical chatlogs of chat conversations between human representatives and customers are extracted. Let M equal the number of chat sessions logs and N be the total number of customer messages across these M sessions. Third, the intents for each chat message of all sessions are classified using an "intent classifier model," which compares the user text message with each of the variations of intents extracted from Intent and Intent Variation Table 410 using a tf-idf based text similarity approach.

| Session ID | Message | Intent ID |
|---|---|---|
| S1 | M1 | I1 |
| S1 | M2 | I2 |
| S1 | M3 | I3 |
| S1 | M4 | I2 |
| S2 | M1 | I2 |
| S2 | M2 | I6 |
| S2 | M3 | I4 |
| S2 | M4 | I7 |

Fourth, a Business Value (BV) per session is calculated. For each session, measure the business activity of the customer who participated in the chat session for the next T days after the chat session (T is configurable). The business activity will vary from company to company, but one possible set of parameters for measuring business activities includes: a number of accounts opened, types of accounts opened, a number of accounts closed, types of accounts closed, an amount and/or type of new assets added, an amount and/or type of assets withdrawn, and/or an amount or type of trades made.

Fifth, a Business Value (BV) corresponding to the session for the next T days is calculated. BV is measured on the basis of customer activity based on predefined Business Opportunity States. For an account opening or closing, a Minimum Account Balance is considered as a default Value. For example, an exemplary calculation is:

| Session | Business Activity in next T days | Value | Business Value (BV) |
|---|---|---|---|
| S1 | Open account | P1 | V1 = f(p1, p2, p3) |
|  | Deposit money | P2 |  |
|  | Purchase share | P3 |  |
| S2 | Withdraw money | P1 | V2 = f(p1, p2) |
|  | Close account | P2 |  |

Sixth, a Normalized Business Value (NBV) for each Intent (I) is calculated from all past chat sessions. An exemplary calculation is:

$A = \Sigma BV$ for each Intent I across all sessions.
$B =$ Number of occurrences of I across all sessions.
NBV of Intent $(I) = A/B$.

Seventh, a NBV is assigned to each Intent, creating an Intent-Business Opportunity Value Map. These values can then be used for online prediction of a live test chat message intent.

| Intent-NBV mapping table | |
|---|---|
| Intents | Business Opportunity Value |
| I1 | BO_V1 |
| I2 | BO_V2 |
| I3 | BO_V3 |
| I4 | BO_V4 |

In some embodiments, the Online Business Value is predicted according to the following steps. For a live chat session, a Probable Business Value (BV) can be predicted for each incoming message using the "Intent-Business Opportunity Value Map" referenced above. An example table is:

| Session ID | Event ID (Only customer side messages are shown, Agent side messages are hidden) | Client Message | Intent ID | Business Opportunity Value (using table Intent-Business Opportunity Value Map) |
|---|---|---|---|---|
| 21 | 1 | Hello | 234 | —(No associated business value as intent is of social talk nature) |
| 21 | 3 | I want to open the brokerage account? | 754 | $BO\_V_{754}$ |
| 21 | 5 | What are your brokerage charges per trade? | 78 | $BO\_V_{78}$ |
| 21 | 8 | That's ridiculously high as compared to other brokers | 89 | $BO\_V_{89}$ |
| 21 | 10 | No worries | 236 | —(No associated business value as intent is of social talk nature) |

In the above table, the first three columns represent typical fields of a chat table, in which an interaction is defined by a "Session ID," various messages in the chat session are identified by "Event ID," and client message is as shown above. The fourth column, "Intent ID," is a result of a classification done by an intent classifier model on the client message. In addition, using the Intent-Business Opportunity Value Map, a business opportunity value is mapped to each classified intent.

Figure 5:
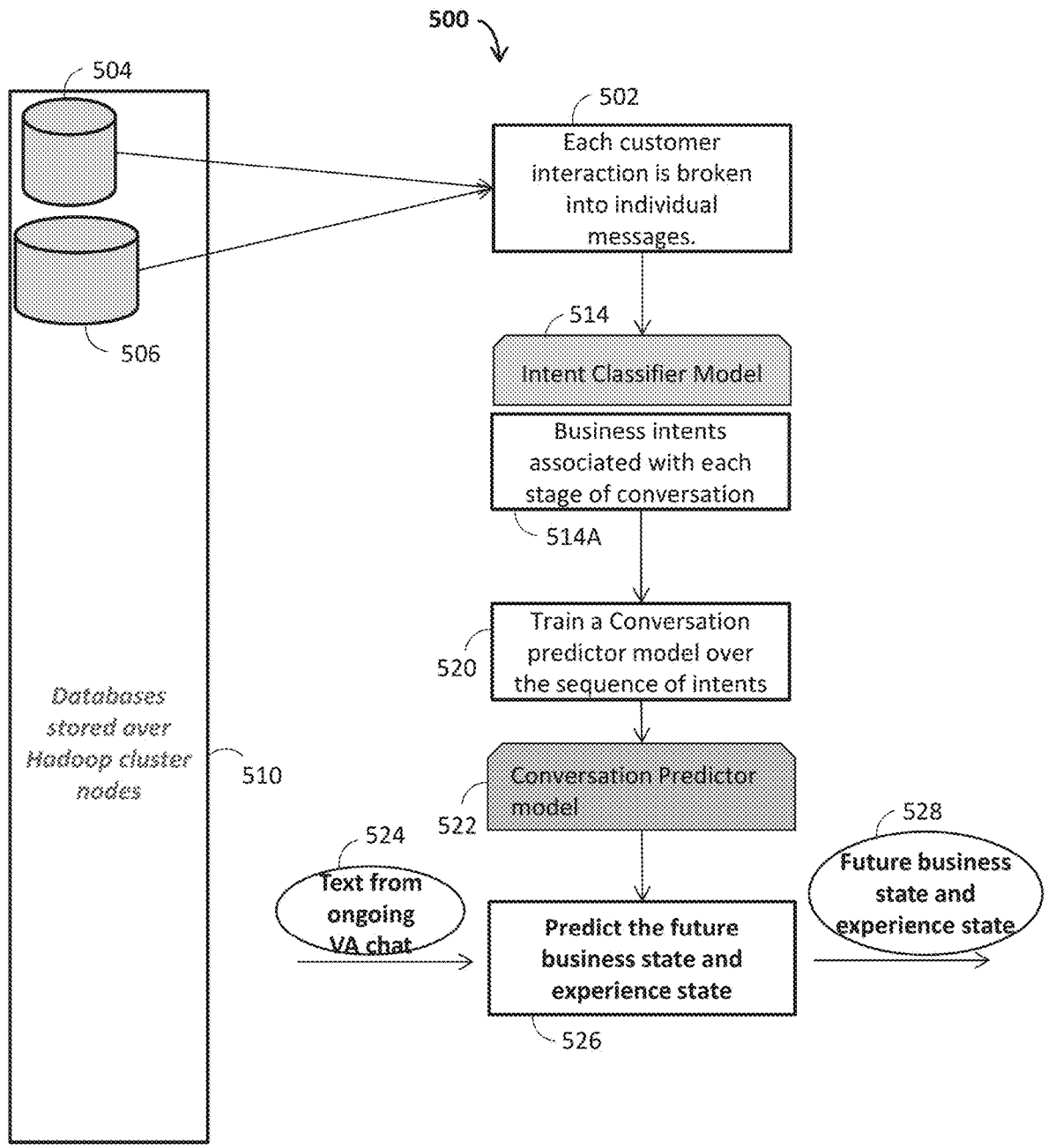
FIG. 5 is a schematic diagram of a method of predicting a future business state and experience state based on text from an ongoing virtual assistant chat conversation, according to an illustrative embodiment of the invention.

FIG. 5 is a schematic diagram of a method 500 of predicting a future business state and experience state, according to an illustrative embodiment of the invention. In a first step 502, each customer interaction (e.g., as drawn from a set of historical data, including chat data 504, phone call transcript data 506) is broken into individual messages. One or more of these historical data sets can be stored on a single Hadoop cluster node, e.g., the node 510 as shown. The broken messages of step 502 are provided to an intent classifier model 514, which produces business intents associated with each message of the conversation in step 514A. Based on the identifications under step 514A, a model to predict the subsequent intents 'conversation predictor model' 522 is trained using the step 520. Then, using text from an ongoing VA chat 524, a future business and experience state predictor module 526 is used to predict a future business state and experience state 528. In some embodiments, these steps function according to the following details.

Offline preparation can proceed as follows. First, extract all historical chatlogs of chat conversations between human representatives and customers. Let M equal the number of chat sessions logs with a total of N customer messages across these M sessions. Second, classify the intents for each chat message of all sessions using an intent classifier model. For example:

| Session | Message | Intent_Id |
|---------|---------|-----------|
| S1 | M1 | I1 |
| S1 | M2 | I2 |
| S1 | M3 | I3 |
| S1 | M4 | I2 |
| S2 | M1 | I2 |
| S2 | M2 | I6 |
| S2 | M3 | I4 |
| S2 | M4 | I7 |

Third, treat each session as sequence of Intent IDs. Thus, session S1 can be treated as [I1, I2, I3, I2], and all M sessions can be represented as a list of Intent IDs. Fourth, taking the analogy from natural language processing language models, which predict the next word given a set of preceding words, a conversation predictor model predicts the next intent given a set of intents in the chat sessions. Thus, as a language model is trained over lists of sentences where sentences are sequences of token words, a conversation predictor model is trained over given M chat sessions where each session represented as list of intent IDs using a Long Short-term Memory based neural network implementation. Intuitively, this approach is based on customer conversations typically following some kind of sequential pattern, e.g., "How do I open a brokerage account?" is followed up with "What are your fees for the brokerage account?".

With respect to the prediction of Business Opportunity Value for the future (e.g., the rest of a session), we can find the current business opportunity value based on the existing chat that has happened so far. Take the current state of the chat below. The problem is to find what will be the future or eventual business state so that the decision of transferring to an agent can be made preemptively.

| Customer Event Num | Message |
|--------------------|---------|
| 1 | How are you? |
| 2. | I am looking for the method to open a new brokerage account with you |

First, find the intents in the existing chat:

| Customer Event Num | Message | Intent ID |
|--------------------|---------|-----------|
| 1 | How are you? | 233 |
| 2. | I am looking for the method to open a new brokerage account with you | 754 |

Then, use the predictions from conversation predictor (created above in the offline steps) to predict the probability of all Intents IDs for the next K messages that can be predicted in the future. Note that K is configurable; here, K is chosen as 6. Thus, the following as probability distribution of different intents is depicted below:

| | I1 | I2 | I3 | ... | $I_{Nintents-1}$ | $I_{Nintents}$ |
|---|---|---|---|---|---|---|
| Probability of first future message being $I_i$ | 0.02 | 0.003 | 0 | ... | 0.2 | 0.01 |
| Probability of second future message being $I_i$ | 0.1 | 0.3 | 0 | ... | 0.001 | 0.002 |
| ... | ... | ... | ... | ... | ... | ... |
| Probability of $5^{th}$ future message being $I_i$ | 0.4 | 0.05 | 0 | ... | 0.001 | 0.002 |
| Probability of 3rd message being $I_i$ | 0.03 | 0.3 | 0 | ... | 0.4 | 0.04 |

Then, using the mapping Intent-Business Opportunity Value Map, the expected value for each future message can be found by using the following:

$$BO\_V = f(I)$$

$EVk$=ExpectedValue of Business Opportunity for $k^{th}$ future message=Weighted average of $BO\_V$ for each intent weighted by intent probability= $\Sigma p_{k,Ii} * BO\_V_{Ii}$ Then, a weighted sum of expected values across the future first to the future Kt message can be taken, giving a higher weight to near-future messages in comparison to messages to occur further in the future. The expected value of Business Opportunity for rest of session is then given by: $\Sigma w_k * EV_k$ Offline data preparation can proceed as follows. First, one or more historical chat logs between human representatives and customers can be extracted. Consider a situation in which M chat sessions logs include a total of N customer messages across the M sessions. The 'intent classifier' and 'customer experience state classifier' modules can be run on each of the customer messages in all the historical chat logs to obtain the Intent ID and Customer Experience states:

| Session ID | Event ID (Only customer side messages are shown, Agent side messages are hidden) | Client Message | Intent ID | Customer Experience |
|---|---|---|---|---|
| 21 | 1 | Hello | 234 | Neutral |
| 21 | 3 | I want to open the brokerage account? | 754 | Neutral |
| 21 | 5 | What are your brokerage charges per trade? | 78 | Neutral |

-continued

| Session ID | Event ID (Only customer side messages are shown, Agent side messages are hidden) | Client Message | Intent ID | Customer Experience |
|---|---|---|---|---|
| 21 | 8 | That's ridiculously high as compared to other brokers | 89 | Negative |

Next, a Customer Experience Value can be assigned to each state. This mapping can be called a Customer Experience State-Customer Experience Value Map. In some embodiments, there are unique NCE customer experience states.

| Business Opportunity State | Value |
|---|---|
| CE1 | CE_V1 |
| CE2 | CE_V2 |
| CE3 | CE_V3 |
| CE4 | CE_V4 |

Each unique Intent ID can also be associated with various customer experience states that have occurred across all historical chat sessions. This can be done to see how a particular intent is associated with different experience states. Consider the following $N_{intents} * N_{CE}$ matrix where each cell (row=$I^{th}$ intent and column=$J^{th}$ CE) represents how many times (in %) $I^{th}$ intent has appeared with $j^{th}$ CE in all historical sessions.

|  | $CE_1$ | $CE_2$ | ... | $CE_{Nce}$ | $CE_{Nce}$ |
|---|---|---|---|---|---|
| $I_1$ | 90% | 1% | ... | 0% | 0% |
| $I_2$ | 10% | 50% | ... | 2% | 0% |
| ... | ... | ... | ... | ... | ... |
| ... | ... | ... | ... | ... | ... |
| $I_{Nintents}$ | 20% | 60% | ... | 3% | 2% |

A Customer Experience Value can be associated with each intent based on a weighed sum of $CE\_V_i$ where weights are the probabilities. The CE for Intent i is then $\Sigma p_{k, CEi} * CE\_V_{Ii}$. Thus, the following mapping is obtained between Intents and associated Customer Experience Value as part of the Intent-Customer Experience Value map.

|  | CE_V |
|---|---|
| $I_1$ | $CE\_V_{I1}$ |
| $I_2$ | $CE\_V_{I1}$ |
| ... | ... |
| $I_{Nintents}$ | $CE\_V_{I1}$ |

Given an ongoing chat between a chatbot and a customer that has progressed to a certain stage, the current customer experience score can be based on the existing chat that has happened so far. The problem is to predict the future customer experience state so that the decision of transferring to agent can be made preemptively. For example, here is a current state of chat:

| Customer Event Num | Message |
|---|---|
| 1 | How are you? |
| 2. | I am looking for the method to open a new brokerage account with you |

First, first find the intents in the existing chat:

| Customer Event Num | Message | Intent ID |
|---|---|---|
| 1 | How are you? | 233 |
| 2. | I am looking for the method to open a new brokerage account with you | 754 |

Use the predictions from the conversation predictor model shown and described above in connection with the offline steps to predict a probability of all Intents IDs for next K messages that can be seen in the future. (As above, K is configurable, and here K is 6.) Thus the following probability distribution of different intents results:

|  | I1 | I2 | I3 | ... | $I_{Nintents-1}$ | $I_{Nintents}$ |
|---|---|---|---|---|---|---|
| Probability of first future message being $I_i$ | 0.02 | 0.003 | 0 | ... | 0.2 | 0.01 |
| Probability of second future message being $I_i$ | 0.1 | 0.3 | 0 | ... | 0.001 | 0.002 |
| ... | ... | ... | ... | ... | ... | ... |
| ... | ... | ... | ... | ... | ... | ... |
| Probability of $5^{th}$ future message being $I_i$ | 0.4 | 0.05 | 0 | ... | 0.001 | 0.002 |
| Probability of 3rd message being $I_i$ | 0.03 | 0.3 | 0 | ... | 0.4 | 0.04 |

Using the mapping Intent-Customer Experience Value map, an expected value for each future message can be calculated using the following calculation:

Expected Value of Customer Experience for $k^{th}$ future message=Weighted average of CE_V for each intent weighted by intent probability=$\Sigma p_{k, Ii} * CE\_V_{Ii}$. Then, a weighted sum of expected values across future first to future $K^{th}$ messages can be calculated by giving a higher weight to near future message in comparison to far future messages. Then, the expected value of customer experience for the remainder of the session is given by: $\Sigma w_k * CE\_EV_k$.

Figure 6:
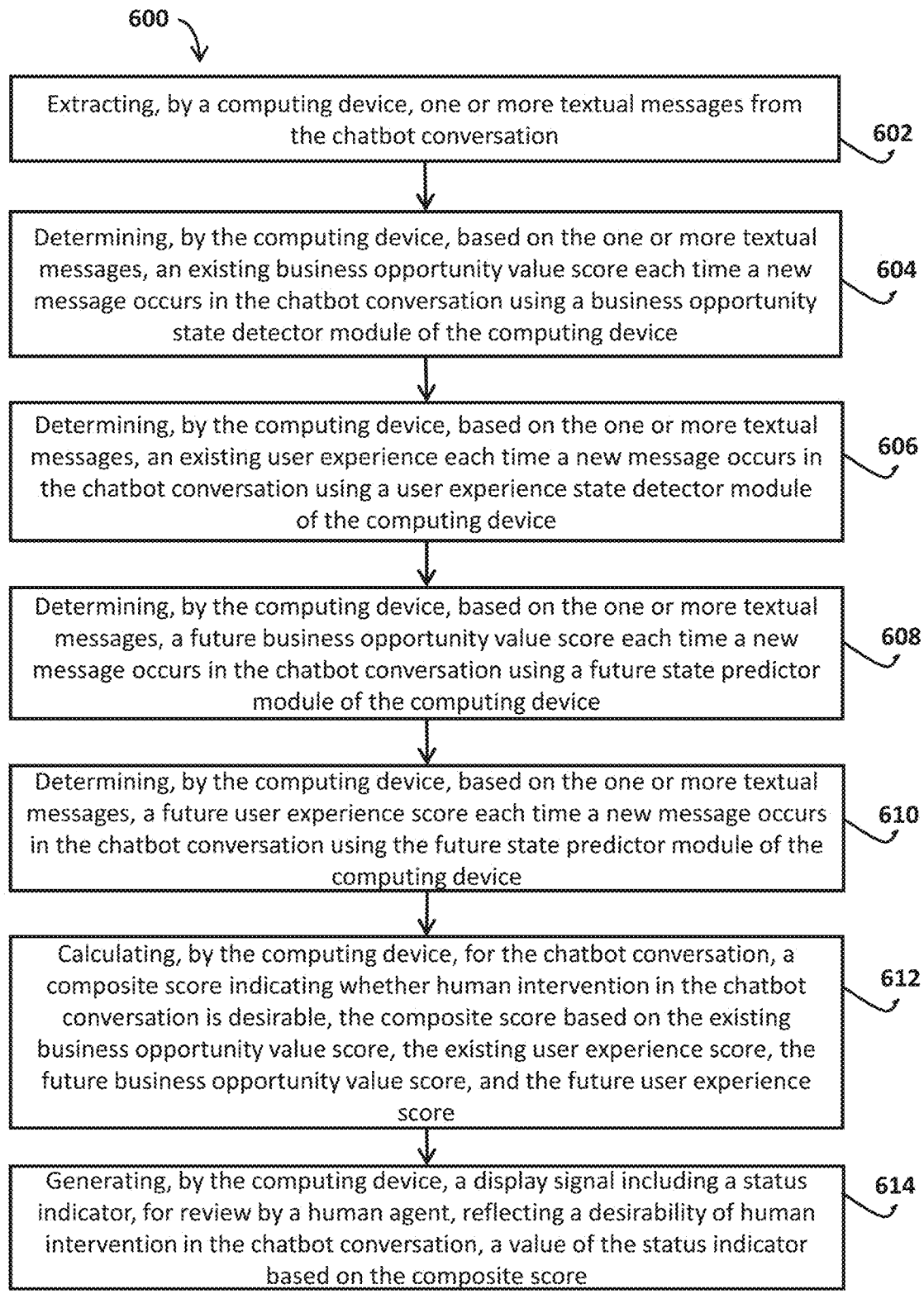
FIG. 6 is a schematic diagram of a method of predicting a need for human intervention in a chatbot conversation, according to an illustrative embodiment of the invention.

FIG. 6 is a schematic diagram of a method 600 of predicting a need for human intervention in a chatbot conversation, according to an illustrative embodiment of the invention. The signals for each of (1) Existing Business Opportunity Value score (BOe), (2) Existing Customer Experience Score (CEe), (3) Future Business Opportunity Value score (BOf), and (4) Future Customer Experience Score (CEf) can all be combined into a singular score that can provide the need for human intervention depicted by multiple states, e.g.: "all good;" "may need help;" and "requires help." A classifier model can be trained using a logistic regression that can predict a state depicting a need for human intervention given the four scores above. The model output can be a number between 0 and 1 (a user experience score), which can depict a probability that human intervention is required or desired. Optimal thresholds T1 and T2 for classifying this model output probability into one of three discrete classes can be identified. For example, a state can be assigned a "negative" label if it is between 0 to 0.3; a "neutral" label if between 0.3 to 0.7; and a "positive" label if between 0.7 to 1. In some embodiments, thresholds can be used to adjust a number of chatbot-driven chats based on availability of human representatives in call center. The thresholds can be tuned based on how busy or how free the call center is at a given moment. Thus, during a busy period, when all representatives are busy attending to customers, the threshold can be loosened so that most of the queries fall into 'All good' or 'May need help' and only a few are classified into 'Requires help.' On the other hand, during a slow period during which human representatives are relatively free, the organization may want to tighten the threshold so that more and more conversations are passed to representatives, even if there is a low need or desirability of intervention.

In some embodiments, as chats happen via chatbot, the following feedback signal can be generated: (a) a prediction of customer experience can be based on explicit feedback from a customer; (b) a prediction of business opportunity can be based on implicit feedback, e.g., activity in a week following the chat; (c) a prediction of follow up question intents at each stage of chat can be based on what actually transpired in chat. This feedback can allow updating the Customer Experience and Business Opportunity scores assigned to various Intents and can help in updating the conversation predictor model periodically, thus allowing more precise intent prediction for upcoming chat questions.

Referring to FIG. 6, in a first step 602, one or more textual messages are extracted from a chatbot conversation by a computing device. In a second step 604, an existing business opportunity value score each time a new message occurs in the chatbot conversation is determined, based on the one or more textual messages, using a business opportunity state detector module of the computing device. In a third step 606, the computing device determines, based on the one or more textual messages, an existing user experience score each time a new message occurs in the chatbot conversation using a user experience state detector module of the computing device. In a fourth step 608, the computing device determines, based on the one or more textual messages, a future business opportunity value score each time a new message occurs in the chatbot conversation using a future state predictor module of the computing device. In a fifth step 610, the computing device determines, based on the one or more textual messages, a future user experience score each time a new message occurs in the chatbot conversation using the future state predictor module of the computing device. In a sixth step 612, the computing device calculates, for the chatbot conversation, a composite score indicating whether human intervention in the chatbot conversation is desirable, the composite score based on the existing business opportunity value score, the existing user experience score, the future business opportunity value score, and the future user experience score. In a seventh step 614, the computing device generates a display signal including a status indicator, for review by a human agent, reflecting a desirability of human intervention in the chatbot conversation, a value of the status indicator based on the composite score.

Figure 7:
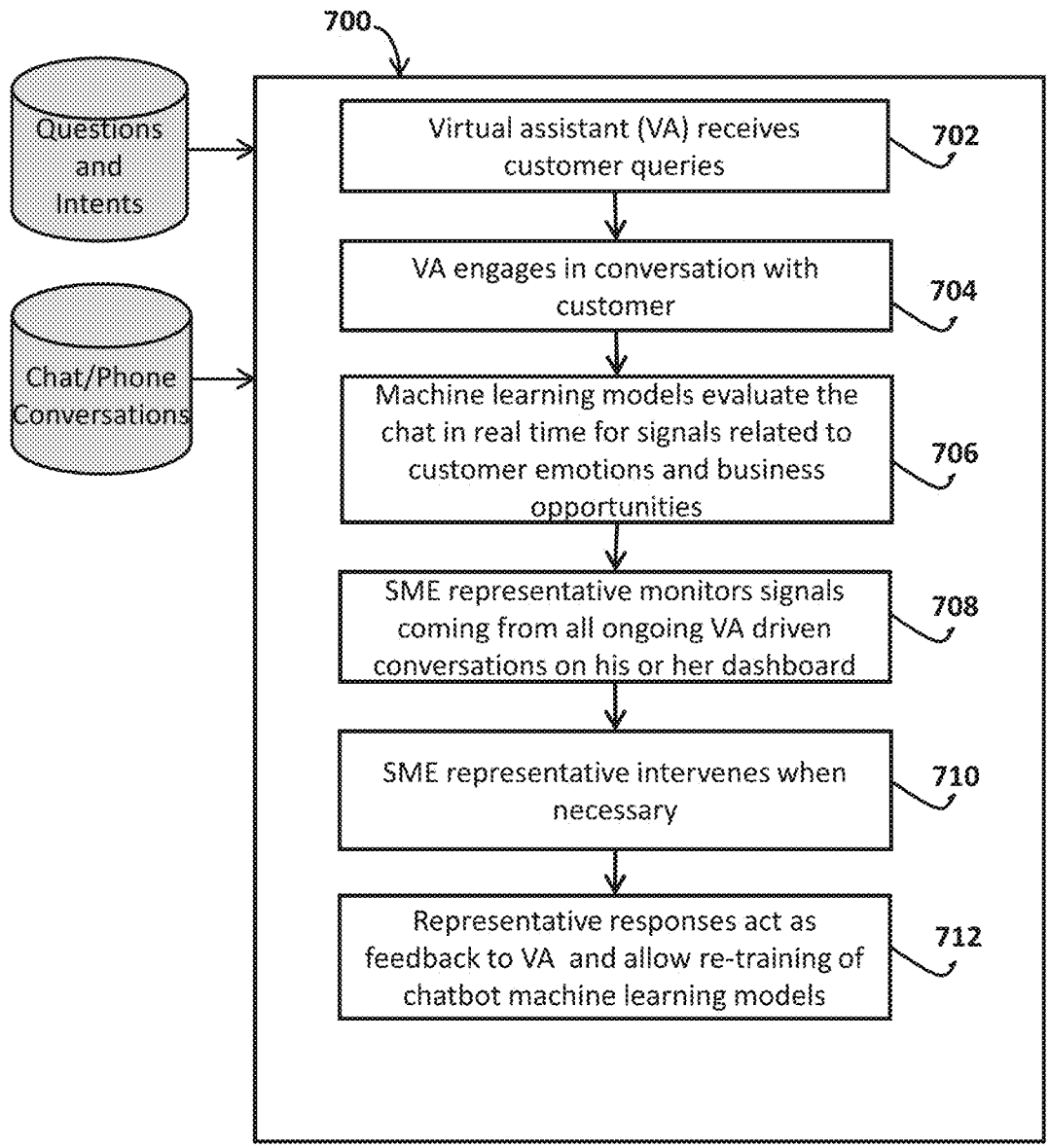
FIG. 7 is a flow diagram showing a method of operating an improved virtual assistant system, according to an illustrative embodiment of the invention.

FIG. 7 is a flow diagram showing a method 700 of operating an improved virtual assistant system, according to an illustrative embodiment of the invention. In a first step 702, a virtual assistant receives customer queries, e.g., provided by a customer over the Internet. In a second step 704, the virtual assistant engages in conversation with the customer. In a third step 706, machine learning models evaluate the VA chat in real time for signals related to customer experience and business opportunities. In a fourth step 708, a SME representative monitors signals coming from all ongoing VA driven conversations on his or her dashboard. In a fifth step 710, a SME representative intervenes when necessary. In a sixth step 712, representative responses act as feedback to VA and allow re-training of chatbot machine learning models.

Figure 8:
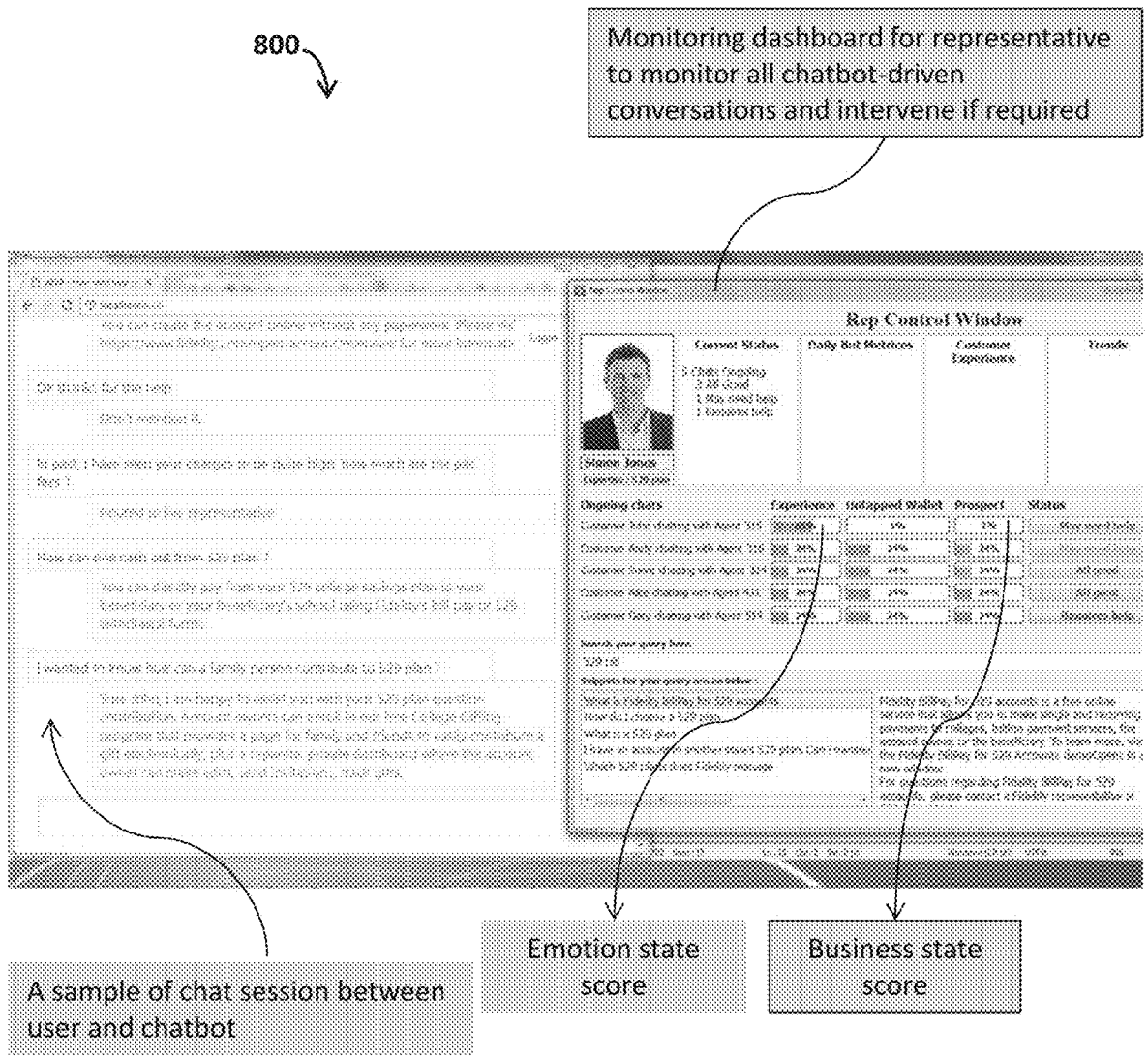
FIG. 8 is an illustration of a screenshot of a monitoring dashboard for a representative to monitor one or more chatbot conversations and intervene if desired, according to an illustrative embodiment of the invention.

FIG. 8 is an illustration of a screenshot 800 of a monitoring dashboard for a representative to monitor one or more chatbot conversations and intervene if desired, according to an illustrative embodiment of the invention. As depicted, on the left hand side of the screen, a sample chat session between a user and a chatbot is depicted, and on the right hand side of the screen, the monitoring dashboard is depicted. In this case, the monitoring dashboard is configured for a representative to monitor all chatbot driven conversations and to intervene if required or desired. The monitoring dashboard displays a number of indicators for multiple ongoing chats, the indicators including an experience metric (based, e.g., on an emotion state score and other interaction signals), an "untapped wallet" metric (based, e.g., on upsell or cross sell business opportunities), and a "prospect" metric (based, e.g., on a business state score). A comprehensive "status" indicator is also displayed, which, as discussed above, is displayed as "all good," "may need help," or "requires help." Other features of use to a monitoring representative can also be included in the dashboard.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. The computer program can be deployed in a cloud computing environment (e.g., Amazon® AWS, Microsoft® Azure, IBM®). Method steps can be performed by one or more processors executing a computer program to perform functions of the invention by operating on input data and/or generating output data.

To provide for interaction with a user, the above described techniques can be implemented on a computing device in communication with a display device, e.g., a plasma or LCD (liquid crystal display) monitor or a mobile computing device display or screen for displaying information to the user and a keyboard and a pointing device, e.g., a mouse, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile computing device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

In some embodiments, software elements used include Python (e.g, Python 2.7), Hadoop distribution, and/or PyQT. In some embodiments, hardware elements used include a computing system and Hadoop cluster nodes. In some embodiments, data sources used including databases storing customer chat interactions phone transcripts, and/or web search queries.

It should also be understood that various aspects and embodiments of the technology can be combined in various ways. Based on the teachings of this specification, a person of ordinary skill in the art can readily determine how to combine these various embodiments. In addition, modifications may occur to those skilled in the art upon reading the specification.

What is claimed is:

1. A computerized method of assessing a chatbot conversation with a user, the computerized method comprising:
    extracting, by a computing device, one or more textual messages from the chatbot conversation;
    determining, by the computing device, based on the one or more textual messages, an existing business opportunity value score after a textual message occurs in the chatbot conversation using a business opportunity state detector module of the computing device;
    determining, by the computing device, based on the one or more textual messages, an existing user experience score after the textual message occurs in the chatbot conversation using a user experience state detector module of the computing device;
    determining, by the computing device, based on the one or more textual messages, a future business opportunity value score after the textual message occurs in the chatbot conversation using a future business state predictor module of the computing device;
    determining, by the computing device, based on the one or more textual messages, a future user experience score after the textual message occurs in the chatbot conversation using a future experience state predictor module of the computing device;
    calculating, by the computing device, for the chatbot conversation, a composite score indicating whether human intervention in the chatbot conversation is desirable, the composite score based on the existing business opportunity value score, the existing user experience score, the future business opportunity value score, and the future user experience score; and
    generating, by the computing device, a display signal including a status indicator, for review by a human agent, reflecting a desirability of human intervention in the chatbot conversation, a value of the status indicator based on the composite score.

2. The method of claim 1 further including displaying, by a screen in electronic communication with the computing device, the status indicator based on the display signal.

3. The method of claim 1 further including providing, by the computing device, a hyperlink permitting the human agent to monitor the chatbot conversation in real-time.

4. The method of claim 1 further including determining, by the computing device, a new value for each of the existing user experience score, the existing business opportunity value score, the future business opportunity value score, the future user experience score, and the composite score each time a new message occurs; and updating, by the computing device, the value of the status indicator accordingly.

5. The method of claim 1 wherein the value of the status indicator is one of multiple possible values, each possible value corresponding to a range of possible composite scores falling within an upper boundary and a lower boundary.

6. The method of claim 5 wherein the upper and lower boundaries are adjustable by the human agent or another operator to accommodate varying levels of incoming customer conversation traffic.

7. The method of claim 1 further including providing, by the computing device, a feedback signal including a prediction of at least one of (i) an experience metric for the user; (ii) a business opportunity metric associated with the user, based on expected business activity by the user during a specified interval following termination of the chatbot conversation; or (iii) one or more follow up questions by the user at one or more stages of the chatbot conversation, based on a textual representation of the chatbot conversation at a corresponding point in time.

8. The method of claim 1 further including performing, by the computing device, each step of the method for multiple simultaneous chatbot conversations.

9. A computerized system for assessing a chatbot conversation with a user, the computerized system comprising:
- a computing device capable of extracting one or more textual messages from the chatbot conversation, the computing device including: (i) a user chat interface module for receiving user query messages and generating chatbot reply messages; (ii) a business opportunity state detector module for determining, based on the one or more textual messages, an existing business opportunity value score after a textual message occurs in the chatbot conversation; (iii) a user experience state detector module for determining, based on the one or more textual messages, an existing user experience score after a textual message occurs in the chatbot conversation; and (iv) a future business opportunity state predictor module for determining, based on the one or more textual messages, a future business opportunity value score after a textual message occurs in the chatbot conversation; and (v) a future user experience state predictor module for determining, based on the one or more textual messages, a future user experience score after a textual message occurs in the chatbot conversation,
- the computing device further capable of (i) calculating a composite score indicating whether human intervention in the chatbot conversation is desirable, the composite score based on the existing business opportunity value score, the existing user experience score, the future business opportunity value score, and the future user experience score, and (ii) generating a display signal including a status indicator, for review by a human agent, reflecting a desirability of human intervention in the chatbot conversation, a value of the status indicator based on the composite score; and
- a database in electronic communication with the computing device, the database including textual files of one or more chatbot conversations.

10. The computerized system of claim 9 further including a screen, in electronic communication with the computing device, capable of displaying the status indicator based on the display signal.

11. The computerized system of claim 9 wherein the computing device further includes a human intervention need score generating module for calculating the composite score.

12. The computerized system of claim 9 wherein the computing device further includes a feedback signal generator for generating and sending a feedback signal indicating an user experience to a virtual agent.

13. The computerized system of claim 9 wherein the computing device further includes a lead signal generator for providing a signal to a dashboard for monitoring by a virtual agent.

14. The computerized system of claim 9 wherein the computing device periodically updates at least one of the conversation predictor module, existing business opportunity classifier module, future business opportunity classifier module, current experience classifier module, or future experience classifier module based on further accumulated data.

15. The computerized system of claim 9 wherein the computing device periodically re-trains at least one of the conversation predictor module, existing business opportunity classifier module, future business opportunity classifier module, current experience classifier module, or future experience classifier module based on feedback from the feedback signal generator.

16. The computerized system of claim 9 wherein the computing device updates the business opportunity state predictor module periodically based on further accumulated textual messages from the chatbot conversation.

17. The computerized system of claim 9 wherein the computing device further generates predictions of future user intents to occur in the chatbot conversation and compares the predictions to real subsequent chatbot conversation messages to update a conversation predictor module of the computerized system accordingly.

* * * * *